United States Patent [19]

Sasaki et al.

[11] Patent Number: 4,983,561
[45] Date of Patent: Jan. 8, 1991

[54] PROCESS FOR PRODUCING SOLID CATALYST FOR USE IN POLYMERIZATION OF OLEFINS

[75] Inventors: Toshio Sasaki; Eiji Sogabe; Takeshi Ebara, all of Ichihara, Japan

[73] Assignee: Sumitomo Chemical Company, Limited, Osaka, Japan

[21] Appl. No.: 406,275

[22] Filed: Sep. 12, 1989

[51] Int. Cl.⁵ .............................................. C08F 4/646
[52] U.S. Cl. ..................................... 502/107; 502/104; 502/108; 502/115; 502/116; 502/120; 502/126; 502/127; 526/119
[58] Field of Search ............... 502/104, 107, 108, 115, 502/116, 120, 126, 127

[56] References Cited

U.S. PATENT DOCUMENTS 4,672,050   6/1987   Sasaki et al. ................... 502/116

FOREIGN PATENT DOCUMENTS

0196585   10/1986   European Pat. Off. .
0244678   11/1987   European Pat. Off. .
2083483    3/1982   United Kingdom .

Primary Examiner—Patrick P. Garvin
Attorney, Agent, or Firm—Stevens, Davis, Miller & Mosher

[57] ABSTRACT

A process for producing a trivalent titanium compound-containing solid catalyst for use in the polymerization of olefins which comprises treating, with an ester compound, a solid product obtained by reducing a titanium compound represented by the following general formula:

$$\text{Ti}(OR^1)_n X_{4-n}$$

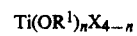

($R^1$ represents hydrocarbon group having 1 to 20 carbon atoms, X represents halogen atom, and n represents a number satisfying $0 < n \leq 4$) with an organomagnesium compound in the presence of an organic silicon compound having Si—O bond, and thereafter treating it with a mixture of an ester compound and titanium tetrachloride.

36 Claims, 1 Drawing Sheet

PROCESS FOR PRODUCING SOLID CATALYST FOR USE IN POLYMERIZATION OF OLEFINS

BACKGROUND OF THE INVENTION

1. Field of the Invention

This invention relates to a process for producing a solid catalyst used in the production of olefin polymers, and more particularly to a process for producing a novel solid catalyst having a very high polymerizing activity per solid catalyst and per titanium atom which is for use in producing an olefin polymer containing very small amounts of catalyst residue and amorphous polymer and which is excellent in mechanical properties and processability.

2. Description of the Prior Art

As a process for producing polymers of α-olefins such as propylene, butene-1 and the like, the process using the so-called Ziegler-Natta catalyst constituted of a transition metal compound belonging to Group IV to Group VI of the periodic table and a organometallic compound belonging to Group I to Group III is generally well known. Particularly, in the industrial production of α-olefin polymers, titanium trichloride catalyst is widely used.

In this production process, however, amorphous polymer is formed as a by-product in addition to the valuable highly stereospecific α-olefin polymer.

This amorphous polymer is not valuable industrially and exercises a greatly adverse influence upon the mechanical properties of α-olefin polymer at the time of using it as film, fiber or other processed product.

Further, formation of the amorphous product brings about a loss in starting monomer. At the same time, it indispensably requires equipment for removing the amorphous polymer, and thereby brings about a very large industrial disadvantage.

Accordingly, if formation of such amorphous polymer can be prevented or suppressed to a slight extent, it will bring about a very great merit.

Moreover, in α-olefin polymers produced according to such a polymerization process, a catalyst residue remains to cause various troubles on stability and processability of the α-olefin polymer. Thus, it becomes necessary to provide equipment for removing the catalyst residue and stabilizing the polymer.

This fault can be overcome by enhancing the catalyst activity represented by the weight of formed α-olefin polymer per unit weight of catalyst, by which the equipment for removing a catalyst residue becomes unnecessary and the production cost of the α-olefin polymer can be reduced.

As production processes of titanium trichloride, mention may be made of the following: 1) reduction of titanium tetrachloride with hydrogen, followed by activation of the reduced product by its pulverization in ball mill, 2) reduction of titanium tetrachloride with metallic aluminum, followed by activation of the reduced product by its pulverization in ball mill, 3) reduction of titanium tetrachloride with an organoaluminum compound at a temperature of −30° to 30° C., followed by heat-treatment of the reduced solid product at a temperature of 120° to 180° C., etc.

However, titanium trichloride produced by these processes is not satisfactory in catalyst activity and stereospecificity.

In Japanese Patent Publication No. 53-3356, a process which comprises reducing titanium tetrachloride with an organoaluminum compound to obtain a reduced solid material, followed by treating the reduced solid material with a complexing agent and further reacting it with titanium tetrachloride is mentioned. Further, in Japanese Patent application Kokai (Laid-Open) No. 59-126401, a process proposed by the present inventors previously which comprises reducing a titanium compound represented by the following general formula:

$$Ti(OR)_nX_{4-n}$$

with an organoaluminum compound, followed by treating the reduced product with a mixture consisting of an ether compound and titanium tetrachloride is mentioned. If α-olefin is polymerized with a catalyst system comprising a solid catalyst component obtained according to these processes and an organoaluminum compound, however, catalyst activity is not yet satisfactorily high, though the resulting α-olefin polymer has a high stereo- specificity.

It is also known that titanium trichloride can be synthesized by reducing titanium tetrachloride with an organomagnesium compound such as Grignard reagent.

The present inventors previously proposed a process which comprises reducing titanium tetrachloride with an organomagnesium compound to obtain a solid product and treating said solid product with a Lewis acid (Japanese Patent Publication No. 57-24361) and a process which comprises reducing an alkoxytitanium compound with an organomagnesium compound in the presence of an organic silicon compound having the Si—O bond to obtain a solid product and treating said solid product with a mixture consisting of an ester compound and an ether compound (Japanese Patent Application Kokai (Laid-Open) No. 61-287904).

The catalysts obtained by these processes cannot yet give α-olefin polymer having a satisfactory stereospecificity, though they exhibit a high catalytic activity in the polymerization of α-olefins.

SUMMARY OF THE INVENTION

In view of the above-mentioned situation, the problem to be solved by this invention, or the object of this invention, is to provide a process for producing a solid catalyst for use in the polymerization of olefins having so high a catalytic activity and so high a stereospecificity as to make the removal of catalyst residue and amorphous polymer unnecessary.

By the use of the solid catalyst of this invention, the following effects can be achieved:

(1) Since catalytic activity per solid catalyst and per titanium atom is very high, the contents of halogen atom and titanium atom in the resulting polymer, closely related to color, stability and corrosive property of the resulting polymer, can be made quite low without practising any particular procedure for removing catalyst residue. That is, the equipment for removing catalyst residue becomes unnecessary and production cost of olefin polymer can be reduced.

(2) Since the decrease in catalytic activity and stereospecificity with the lapse of polymerization time is very small, formation of polymer per unit quantity of catalyst can be increased by prolonging the polymerization time.

Further, the following effects are also expectable.

(3) The use of the solid catalyst of this invention makes it possible to produce an α-olefin polymer having a very high stereospecificity. In other words, the formation of amorphous polymer as by-product is very small. Accordingly, an α-olefin polymer excellent in mechanical properties can be produced without removing amorphous polymer.

(4) Since the formation of polymer soluble in the polymerization solvent, or a polymer having a low stereospecificity, is very small, process troubles such as deposition of polymer onto reactor wall, pipings, flash hopper, etc. do not occur. Further, since formation of soluble polymer is very small, the starting monomer can be utilized effectively.

This invention relates to a trivalent titanium compound-containing solid catalyst for use in the production of olefin polymers which is obtained by a process which comprises treating a solid product, obtained by reducing a titanium compound represented by the following general formula:

$$Ti(OR^1)_nX_{4-n}$$

($R^1$ represents hydrocarbon group having 1 to 20 carbon atoms, x represents halogen atom, and n represents a number satisfying $0 < n \leq 4$) with an organomagnesium compound in the presence of an organic silicon compound having Si—O bond, with an ester compound, followed by treating it with a mixture consisting of an ester compound and titanium tetrachloride or a mixture consisting of an ester compound, an ether compound and titanium tetrachloride.

By the use of the catalyst system of this invention, the above-mentioned object of this invention can be achieved.

DESCRIPTION OF THE PREFERRED EMBODIMENTS

Figure 1:
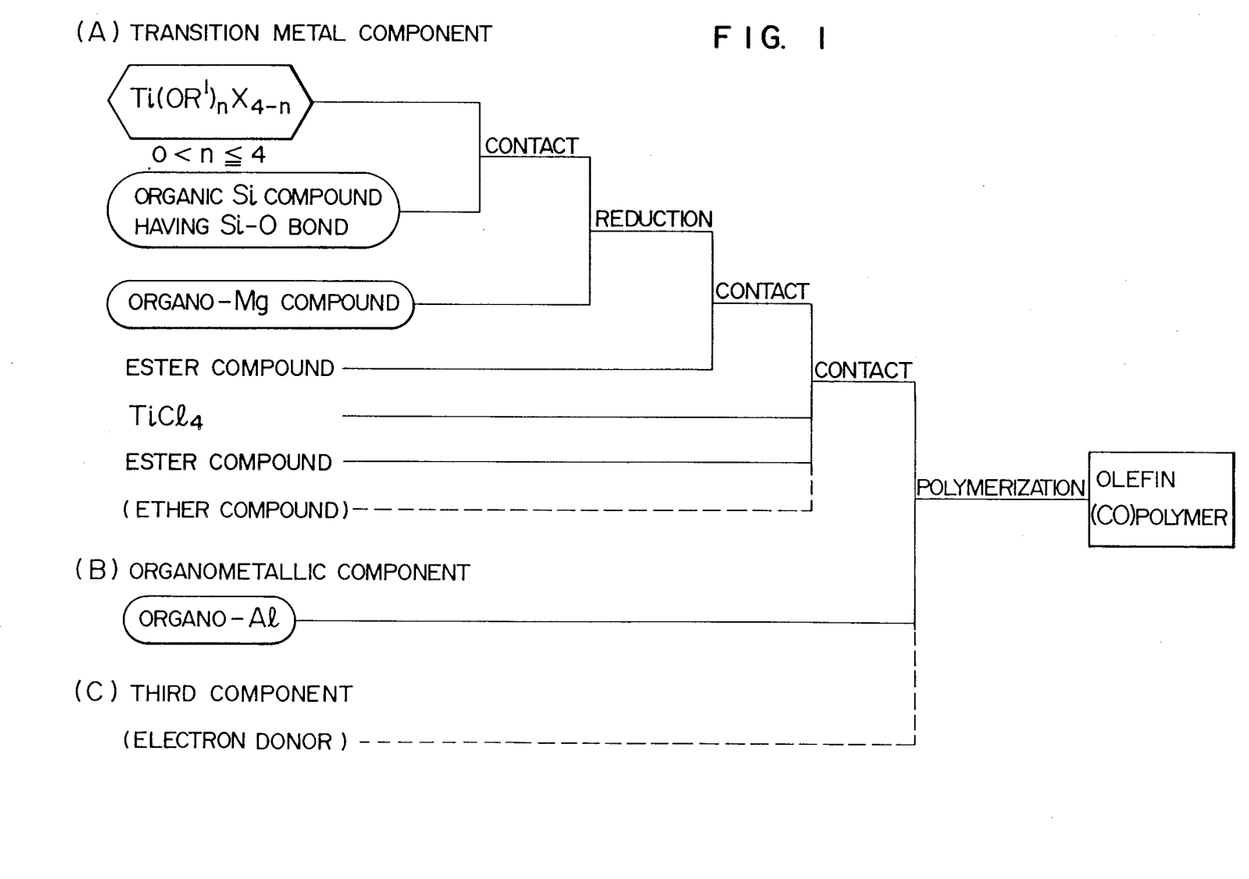
FIG. 1 is a flow chart diagram for facilitating understanding of this invention. This flow chart diagram is nothing other than a typical embodiment of this invention, and it does not limit this invention.

Hereunder, this invention will be explained more concretely.

(a) Titanium compound

The titanium compound used in this invention is represented by the following general formula:

$$Ti(OR^1)_nX_{4-n}$$

($R^1$ represents hydrocarbon group having 1 to 20 carbon atoms, X represents halogen atom, and n represents a number satisfying $0 < n \leq 4$).

Concrete examples of $R^1$ include alkyl groups such as methyl, ethyl, propyl, isopropyl, butyl, isobutyl, amyl, isoamyl, hexyl, heptyl, octyl, decyl, dodecyl and the like; aryl groups such as phenyl, cresyl, xylyl, naphthyl and the like; cycloalkyl groups such as cyclohexyl, cyclopentyl and the like; allyl groups such as propenyl and the like; and aralkyl groups such as benzyl and the like. Among them, alkyl groups having 2 to 18 carbon atoms and aryl groups having 6 to 18 carbon atoms are preferable, and straight chain alkyl groups having 2 to 18 carbon atoms are particularly preferable. It is also possible to use two or more kinds of titanium compounds having different $OR^1$ group.

Examples of the halogen atom represented by X include chlorine, bromine and iodine. Among them, chlorine gives a particularly good result.

The value of "n" in the titanium compound represented by general formula $Ti(OR^1)_nX_{4-n}$ is a value satisfying $0 < n \leq 4$, preferably $2 \leq n \leq 4$, and particularly $n=4$.

As the synthetic method of producing the titanium compound represented by general formula $Ti(OR^1)_nX_{4-n}$ ($0 < n \leq 4$), any of the known methods can be adopted. For example, a method of reacting $Ti(OR^1)_4$ with $TiX_4$ at a desired ratio, or a method of reacting $TiX_4$ with the corresponding alcohol at a desired ratio can be adopted.

(b) Organic silicon compound having Si—O bond

The organic silicon compounds having Si—O bond which can be used in this invention include those represented by the following general formulas:

$$Si(OR^3)_mR^4_{4-m}$$

$$R^5(R^6_2SiO)_pSiR^7_3$$

$$(R^8_2SiO)_q$$

wherein $R^3$ represents a hydrocarbon group having 1 to 20 carbon atoms; $R^4$, $R^5$, $R^6$, $R^7$ and $R^8$ each represents hydrocarbon group having 1 to 20 carbon atoms or hydrogen atom; m represents a number satisfying $0 < m \leq 4$; p represents an integer of 1 to 1,000; and q represents an integer of 2 to 1,000.

Concrete examples of the organic silicon compound include tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, phenylhydropolysiloxane, and the like.

Among these organic silicon compounds alkoxysilane compounds represented by general formula $Si(OR^3)_mR^4_{4-m}$ wherein m satisfies $1 \leq m \leq 4$ are preferable, and tetraalkoxysilane compounds satisfying $m=4$ are particularly preferable.

(c) Organomagnesium compound

As the organomagnesium compound of this invention, arbitrary types of organomagnesium compounds having magnesium-carbon bond can be used. Particularly, Grignard compounds represented by the general formula $R^9MgX$ ($R^9$ represents hydrocarbon group having 1 to 20 carbon atoms and X represents halogen atom), dialkylmagnesium compounds and diarylmagnesium compounds represented by general formula $R^{10}R^{11}Mg$ ($R^{10}$ and $R^{11}$ each represents hydrocarbon group having 1 to 20 carbon atoms) are preferably usable. In these formulas, $R^9$, $R^{10}$ and $R^{11}$, which may be identical or different from one another, represent alkyl, aryl, aralkyl and alkenyl groups having 1 to 20 carbon atoms such as methyl, ethyl, propyl, isopropyl, butyl, sec-butyl, tert-butyl, amyl, isoamyl, hexyl, octyl, 2-ethylhexyl, phenyl, benzyl and the like.

Concrete examples of the organomagnesium compounds are as follows. Thus, examples of the Grignard compound include methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, secbutylmagnesium chloride, sec-butylmagnesium bromide, tert-butylmagnesium chloride, tert-butylmagnesium bromide, amylmagnesium chloride, isoamylmagnesium chloride, phenylmagnesium chloride, phenylmagnesium bromide, and the like. Examples of the compound represented by $R^{10}R^{11}Mg$ include diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, diphenylmagnesium, and the like.

As the solvent used in the synthesis of the above-mentioned organomagnesium compounds, ethereal solvents such as diethyl ether, dipropyl ether, diisopropyl ether, dibutyl ether, diisobutyl ether, diamyl ether, diisoamyl ether, dihexyl ether, dioctyl ether, diphenyl ether, dibenzyl ether, phenetole, anisole, tetrahydrofuran, tetrahydropyran and the like can be used. Apart from them, hydrocarbon solvents such as hexane, heptane, octane, cyclohexane, methylcyclohexane, benzene, toluene, xylene and the like or mixture of the ethereal solvent and the hydrocarbon solvent are also usable. The organomagnesium compound is preferably used in the state of an ethereal solution. As the ether compound used for this purpose, an ether compound having 6 or more carbon atoms in the molecule or an ether compound having cyclic structure is used.

From the viewpoint of catalytic performance, it is particularly preferable to use a Grignard compound represented by $R^9MgCl$ in the state of an ethereal solution.

Hydrocarbon-soluble complexes formed between the above-mentioned organomagnesium compound and an organometallic compound are also usable. As examples of said organometallic compound, organic compounds of Li, Be, B, Al and Zn can be referred to.

(d) Ester compound

As the ester compound of this invention, mono- and poly-valent carboxylic esters including aliphatic carboxylic esters, olefinic carboxylic esters, alicyclic carboxylic esters and aromatic carboxylic esters can be used.

Concrete examples of said ester compound include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, dipropyl phthalate, diisopropyl phthalate, dibutyl phthalate, diisobutyl phthalate, diheptyl phthalate, dioctyl phthalate, diphenyl phthalate and the like.

Among these ester compounds, olefinic carboxylic esters such as methacrylic esters, maleic esters and the like and phthalic esters are preferable, and phthalic diesters are particularly preferable.

(e) Ether compound

As the ether compound which can optionally be used in this invention, diethyl ether, dipropyl ether, diisopropyl ether, dibutyl ether, diamyl ether, diisoamyl ether, dineopentyl ether, dihexyl ether, dioctyl ether, methyl butyl ether, methyl isoamyl ether, ethyl isobutyl ether and the like are preferable, among which dibutyl ether and diisoamyl ether are particularly preferable.

(f) Synthesis of solid catalyst

The solid catalyst of this invention is synthesized by treating a solid product obtained by reducing a titanium compound with an organomagnesium compound in the presence of an organic silicon compound with an ester compound and thereafter treating it with a mixture comprising an ester compound and titanium tetrachloride or a mixture comprising an ester compound, an ether compound and titanium tetrachloride.

The synthetic reaction is carried out in an atmosphere of inert gas such as nitrogen, argon or the like.

In the first step, a titanium compound is reduced with an organomagnesium compound. The reduction may be carried out by either a method which comprises adding an organomagnesium compound to a mixture of a titanium compound or an organic silicon compound, and a method which comprises, inversely, adding a mixture of a titanium compound and an organic silicon compound to a solution of an organomagnesium compound. Among these two methods, the method of adding an organomagnesium compound to a mixture comprising a titanium compound and an organic silicon compound is more preferable from the viewpoint of catalytic activity.

Preferably, the titanium compound and organic silicon compound are used after dissolving or diluting them with an appropriate solvent.

As the solvent used for this purpose, the following can be referred to: aliphatic hydrocarbons such as hexane, heptane, octane, decane and the like; aromatic hydrocarbons such as toluene, xylene and the like; alicyclic hydrocarbons such as cyclohexane, methylcyclohexane, decalin and the like; and ether compounds such as diethyl ether, dibutyl ether, diisoamyl ether, tetrahydrofuran and the like.

The reduction is carried out at a temperature ranging from $-50°$ to $70°$ C., preferably from $-30°$ to $50°$ C., and particularly preferably from $-25°$ to $35°$ C. If temperature of the reduction is too high, the catalyst activity decreases.

It is also possible to synthesize the solid product by reduction in the presence of a porous material such as inorganic oxide, organic polymer or the like so as to impregnate the porous material with the solid product.

As said porous material, those having a pore volume of 0.3 ml/g or more as measured at a pore radius of 200 to 2,000 angstroms and having a mean particle diameter of 5 to 300 microns are preferable.

As said porous inorganic oxide, $SiO_2$, $Al_2O_3$, MgO, $TiO_2$, $ZrO_2$, $SiO_2.Al_2O_3$, $MgO.Al_2O_3$, $MgO.SiO_2.Al_2O_3$ and the like can be referred to.

As said porous organic polymer, polystyrene type, polyacrylic ester type, polymethacrylic ester type, polyacrylonitrile type, polyvinyl chloride type and polyolefin type polymers can be referred to. Their typical examples include polystyrene, styrene-divinylbenzene copolymer, styrene-N,N'-alkylenedimethacrylamide copolymer, styrene-ethylene glycol dimethacrylate copolymer, polymethyl acrylate, polyethyl acrylate, methyl acrylate-divinylbenzene copolymer, ethyl acrylate-divinylbenzene copolymer, polymethyl methacrylate, methyl methacrylate-divinylbenzene copolymer, polyethylene glycol dimethacrylate, polyacrylonitrile, acrylonitriledivinylbenzene copolymer, polyvinyl chloride, polyvinylpyrrolidine, polyvinylpyridine, ethylvinylbenzenedivinylbenzene copolymer, polyethylene, ethylene-methyl acrylate copolymer, polypropylene and the like. Among these porous materials, $SiO_2$, $Al_2O_3$ and polystyrene type polymers are particularly preferable.

Although the time period of dropping is not critical, it is usually in the range from about 30 minutes to about 6 hours. After completion of the reduction, a post-reaction may be carried out optionally at a temperature of 20° to 120° C.

The amount of organic silicon compound is in the range of 1 to 50, preferably 3 to 30, and particularly 5 to 25, as expressed in terms of atomic ratio of silicon atom to titanium atom (Si/Ti) in titanium compound.

The amount of the organomagnesium compound is in the range of 0.1 to 10, preferably 0.2 to 5.0, and particularly 0.5 to 2.0, as expressed in terms of atomic ratio of the sum of titanium atom and silicon atom to magnesium atom (Ti+Si/Mg).

The solid product obtained by the reduction is separated from liquid and several times washed with inert hydrocarbon solvent such as hexane, heptane or the like.

The solid product thus obtained contains trivalent titanium, magnesium and hydrocarbyloxy group, and it is generally amorphous or very weakly crystalline. From the viewpoint of catalytic performance, amorphous structure is more desirable than the other.

The solid product obtained by the above-mentioned procedure is then treated with an ester compound.

The amount of ester compound is 0.1 to 50 moles, preferably 0.3 to 20 moles, and particularly 0.5 to 10 moles, per one mole of titanium atom in the solid product.

Per one mole of magnesium atom in the solid product, the ester compound is used in an amount of 0.01 to 1.0 mole, and preferably 0.03 to 0.5 mole. If the amount of ester compound is too large, destruction of particle takes place.

The treatment of the solid product with the ester compound can be practiced according to any known methods such as slurry method, mechanical pulverization using ball mill, and the like, so long as both the materials can be contacted together. However, mechanical pulverization is undesirable from the industrial point of view because a large amount of fine powder is formed in the solid catalyst component which makes particle size distribution broad. Preferably, both the materials are contacted together in the presence of a diluent.

As the diluent, aliphatic hydrocarbons such as pentane, hexane, heptane, octane and the like, aromatic hydrocarbons such as benzene, toluene, xylene and the like, alicyclic hydrocarbons such as cyclohexane, cyclopentane and the like, and halogenated hydrocarbons such as 1,2-dichloroethane, monochlorobenzene and the like can be used. Among them, aromatic hydrocarbons and halogenated hydrocarbons are particularly preferable.

The diluent is used in an amount of 0.1 ml to 1,000 ml and preferably 1 ml to 100 ml, per one gram of the solid product. Temperature of the treatment is −50° C. to 150° C., and preferably 0° to 120° C. Duration of the treatment is 10 minutes or longer, and preferably 30 minutes to 3 hours. After completion of the treatment, the solid material is separated from liquid and several times washed with inert hydrocarbon solvent to obtain an ester-treated solid product.

In the next step, the ester-treated solid product is treated with a mixture of ester compound and titanium tetrachloride. This treatment is preferably carried out in the state of a slurry. As the solvent used for the slurry formation, aliphatic hydrocarbons such as pentane, hexane, heptane, octane, decane and the like, aromatic hydrocarbons such as toluene, xylene and the like, alicyclic hydrocarbons such as cyclohexane, methylcyclohexane, decalin and the like, and halogenated hydrocarbons such as dichloroethane, trichloroethane, monochlorobenzene, dichlorobenzene, trichlorobenzene and the like can be referred to. Among them, halogenated hydrocarbons and aromatic hydrocarbons are preferable.

Concentration of the slurry is preferably 0.05 to 0.7 g solid/ml solvent, and particularly 0.1 to 0.5 g solid/ml solvent. The reaction temperature is 30° to 150° C., preferably 45° to 120° C., and particularly 60° to 100° C. Though the reaction time is not critical, it is usually 30 minutes to 6 hours.

As the method for feeding the ester-treated solid product, the ester compound and titanium tetrachloride, either the method of adding ester compound and titanium tetrachloride to ester-treated solid or the method of inversely adding ester-treated solid to a solution containing ester compound and titanium tetrachloride may be adopted.

In the method of adding ester compound and titanium tetrachloride to ester-treated solid, a method of adding ester compound and thereafter adding titanium tetrachloride or a method of simultaneously adding ester compound and titanium tetrachloride are desirable. A method of adding a previously prepared mixture of ester compound and titanium tetrachloride to ester-treated solid is particularly preferable.

The reaction between ester-treated solid product and ester compound and titanium tetrachloride may be repeated twice or more. From the viewpoint of catalyst activity and stereospecificity, it is preferable to carry out the reaction using a mixture of ester compound and titanium tetrachloride at least twice.

The amount of the ester compound is 0.02 to 30 moles, preferably 0.05 to 15 moles, and particularly 0.1 to 5 moles, per one mole of titanium atom in the solid product.

The amount of titanium tetrachloride is 1 to 1,000 moles, preferably 3 to 500 moles and particularly 10 to 300 moles, per one mole of titanium atom in the solid product. Per one mole of ester compound, the amount of titanium tetrachloride is 30 to 1,000 moles, preferably 50 to 700 moles, and particularly 100 to 500 moles.

The treatment of an ester-treated solid product with a mixture of ester compound and titanium tetrachloride may optionally be carried out in the presence of an ether compound. Said ether compound is used in an amount of 100 moles or less, preferably 50 moles or less and particulalry 20 moles or less, per one mole of titanium atom in the solid product.

The trivalent titanium compound-containing solid catalyst obtained according to the above-mentioned process is separated from liquid, several times washed with inert hydrocarbon such as hexane, heptane or the like, and then put to use for polymerization.

From the viewpoint of catalyst activity and stereospecificity, it is preferable to wash the solid catalyst after it is separated from liquid, with a large amount of halogenated hydrocarbon solvent such as monochlorobenzene or the like or aromatic hydrocarbon solvent such as toluene or the like at a temperature of 50° to 120° C. at least once and thereafter wash it several times with aliphatic hydrocarbon solvent such as hexane or the like, and thereafter to use it for polymerization.

The solid catalyst of this invention is used for polymerization of olefin in combination with an organoaluminum compound and, if desired, additionally with an electron donor. Concrete examples of such organoaluminum compound and electron donor will be shown below.

(g) Organoaluminum compound

The organoaluminum compound used in this invention in combination with the above-mentioned solid catalyst is one having at least one aluminum-carbon bond in the molecule. The following general formulas represent typical examples of said organoaluminum compound:

$$R_\gamma^{12}AlY_{3-\gamma}$$

$$R^{13}R^{14}Al-O-AlR^{15}R^{16}$$

wherein $R^{12}$, $R^{13}$, $R^{14}$, $R^{15}$, $R^{16}$, $R^{17}$, $R^{18}$, $R^{19}$, $R^{20}$ and $R^{21}$ each represents hydrocarbon group having 1 to 20 carbon atoms; Y and L each represents halogen atom, hydrogen atom or alkoxy group; $\gamma$ represents a number satisfying $2 \leq \gamma \leq 3$; $\beta$ represents a number of 2 or 3; a represents a number satisfying $0 < a < 1$; b represents a number satisfying $0 \leq b < 3$; and c represents a number satisfying $1 \leq c < 3$; provided that $(a+b+c)$ is equal to 3.

Concrete examples of the organoaluminum compound include trialkylaluminums such as triethylaluminum, triisobutylaluminum, trihexylaluminum and the like; dialkylaluminum hydrides such as diethylaluminum hydride, diisobutylaluminum hydride and the like; mixture of trialkylaluminum and dialkylaluminum halide; mixture of trialkylaluminum and alkylaluminum alkoxide; and alkylalumoxanes such as tetraethyldialumoxane, tetrabutyldialumoxane and the like. Sterically hindered alkylaluminum amides synthesized by reacting an organoaluminum compound such as triethylaluminum, triisobutylaluminum, diethylaluminum halide and the like with an amine compound such as 2,2,5,5-tetramethylpyrrolidine, 2,2,6,6-tetramethylpiperidine and the like are also included.

Among these organoaluminum compounds, trialkylaluminums, mixture of trialkylaluminum and dialkylaluminum halide, alkylalumoxanes and sterically hindered alkylaluminum amides are preferable, and triethylaluminum, triisobutylaluminum, mixture of triethylaluminum and diethylaluminum chloride, tetraethyldialumoxane, reaction product of triethylaluminum and 2,2,6,6-tetramethylpiperidine and reaction product of triethylaluminum and 2,2,5,5-tetramethylpyrrolidine are particularly preferable.

The amount of the organoaluminum compound can be varied in as a wide range as 1 to 1,000 moles per one mole of titanium atom in solid catalyst. Preferably, the amount of organomagnesium compound is in the range of 5 to 600 moles per one of titanium atom in solid catalyst.

(h) Electron donor

The electron donor optionally used at the time of polymerization is selected from organic silicon compounds having Si—$OR^2$ bond ($R^2$ is hydrocarbon group having 1 to 20 carbon atoms) or Si—N—C bond, aromatic carboxylic ester compounds and sterically hindered amines.

As said organic silicon compound, alkoxysilane compounds represented by the following general formula:

$$R_t^{22}Si(OR^2)_{4-t}$$

($R^{22}$ and $R^2$ represent hydrocarbon group having 1 to 20 carbon atoms and t represents a number satisfying $0 \leq t \leq 3$) are preferably used.

As said aromatic carboxylic ester compound, methyl benzoate, ethyl benzoate, propyl benzoate, isopropyl benzoate, butyl benzoate, phenyl benzoate, methyl toluene, ethyl toluate, methyl anisate, ethyl anisate, monoethyl phthalate, dimethyl phthalate, methyl ethyl phthalate, diethyl phthalate, dipropyl phthalate, diisopropyl phthalate, dibutyl phthalate, diisobutyl phthalate, diheptyl phthalate, dioctyl phthalate, diphenyl phthalate and the like can be referred to.

As the sterically hindered amine, 2,6-substituted piperidines, 2,5-substituted pyrrolidines, and substituted methylenediamine compounds such as N,N,N',N'-tetramethylmethylenediamine and the like can be referred to.

Among these electron donor, alkoxysilane compounds represented by general formula $R^{22}_t(OR^2)_{4-t}$ and 2,6-substituted piperidines give a particularly good result.

Concrete examples of said alkoxysilane compound include tetramethoxysilane, methyltrimethoxysilane, dicyclohexyldimethoxysilane, diisobutyldimethoxysilane, dioctadecyldimethoxysilane, dimethyldimethoxysilane, cyclohexyltrimethoxysilane, isobutyltrimethoxysilane, octadecyltrimethoxysilane, ethyltrimethoxysilane, phenyltrimethoxysilane, phenylmethyldimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, diethyldiethoxysilane and the like can be referred to. As example of 2,6-substituted piperidine, 2,2,6,6-tetramethylpiperidine and the like can be referred to.

The electron donor is used in an amount of 0.01 to 5 moles, preferably 0.03 to 3 moles and particularly 0.05 to 1.0 mole, per one mole of aluminum atom in organoaluminum compound.

(i) Polymerization of olefin

The method for feeding the catalyst components into polymerization reactor is not critical, so long as they are fed in a moisture-free state in an inert gas such as nitrogen, argon or the like.

The solid catalyst, the organoaluminum compound and the electron donor (optional component) may be fed either separately or after a previous contact between two of them.

The polymerization can be practised in so wide a temperature range as −30° C. to +300° C., preferably −5° to 200° C. Though pressure of the polymerization is not critical, a pressure of about 3 to 2,000 atmospheres is preferable from the viewpoint of industrial applicability and economicity. The mode of polymerization may be any of continuous system and batch system. Slurry polymerization and solution polymerization using inert hydrocarbon solvent such as propane, butane, pentane, hexane, heptane and octane, liquid phase polymerization in the absence of solvent, and gas polymerization are all adoptable, too.

Next, the olefins to which this invention is applicable are those having 2 or more carbon atoms. Concrete examples of such olefin include ethylene, propylene, butene-1, pentene-1, hexene-1, 3-methyl-pentene-1, 4-methylpentene-1, octene-1, decene-1, dodecene-1 and the like, though this invention is by no means limited by these compounds. The polymerization of this invention may be any of homopolymerization and copolymerization. In the copolymerization, two or more kinds of olefins are mixed together and they are contacted with catalyst in this state to obtain a copolymer. A heteroblock copolymerization carrying out the polymerization in two or more steps can also be carried out easily. A chain transfer agent such as hydrogen and the like may be added for the purpose of regulating molecular weight of the resulting polymer.

Next, this invention will be illustrated in more detail by way of the following examples and comparative examples.

EXAMPLE 1

(A) Synthesis of organomagnesium compound

After replacing the inner atmosphere of a one liter flask equipped with a stirrer, a reflux condenser, a dropping funnel and a thermometer with argon gas, 32.0 g of sliced metallic magnesium for Grignard reaction was charged into the flask. Into the dropping funnel were charged 120 g of butyl chloride and 500 ml of dibutyl ether, and their about 30 ml was dropped onto the magnesium placed in the flask to start a reaction. After start of the reaction, they were continuously dropped at 50° C. over a period of 4 hours. After completion of the dropping, the reaction was continued for an additional one hour at 60° C. Then, the reacted solution was cooled to room temperature, and the solid material was filtered off.

The butylmagnesium chloride dissolved in dibutyl ether was hydrolyzed with 1N sulfuric acid and excessive sulfuric acid was back-titrated with 1N sodium hydroxide solution to determine the concentration of butylmagnesium chloride, using phenolphthalein as indicator. As the result, its concentration was 2.1 moles/liter. (B) Synthesis of solid product After replacing the inner atmosphere of a 500 ml flask equipped with a stirrer and a dropping funnel with argon gas, 240 ml of hexane, 5.4 g (15.8 mmoles) of tetrabutoxytitanium and 61.4 g (295 mmoles) of tetraethoxysilane were charged to form a homogeneous solution. Then, 150 ml of the organomagnesium compound synthesized in (A) was slowly dropped thereinto from the dropping funnel over a period of 4 hours, while keeping the inner temperature of the flask at 5° C. After dropping it, the mixture was stirred at room temperature for an additional one hour. The solid product was separated from liquid, thrice washed with each 240 ml portions of hexane and dried under reduced pressure to obtain 45.0 g of a brown colored solid product.

The solid product contained 1.7% by weight of titanium atom, 33.8% of ethoxy group and 2.9% by weight of butoxy group.

In the wide angle X ray diffraction pattern of this solid product by Cu-Kα ray, no clear diffraction peak was observable at all, demonstrating its amorphous structure.

(C) Synthesis of ester-treated solid product

After replacing inner atmosphere of a 100 ml flask with argon gas, 8.6 g of the solid product synthesized in (B), 43 ml of toluene and 5.8 ml (22 mmoles) of diisobutyl phthalate were charged and reacted at 95° C. for one hour.

After the reaction, the solid material was separated from liquid and thrice washed with each 35 ml portions of toluene.

(D) Synthesis of solid catalyst (activating treatment)

After completing the washing step in (C), 21 ml of toluene, 0.48 ml (1.8 mmoles) of diisobutyl phthalate and 12.8 ml (116 mmoles) of titanium tetrachloride were charged into the flask and reacted at 95° C. for 3 hours. After the reaction, the solid product was separated from liquid and washed at that temperature twice with each 43 ml portions of toluene. The above-mentioned treatment using a mixture of diisobutyl phthalate and titanium tetrachloride was repeated once more under the same conditions as above and the solid was thrice washed with each 43 ml portions of hexane to obtain 6.6 g of an ocher colored solid catalyst.

The solid catalyst thus obtained contained 2.1% by weight of titanium atom, 20.2% by weight of magnesium atom and 17.3% by weight of phthalic ester. (E) Polymerization of propylene After replacing the inner atmosphere of a 3 liter agitation type autoclave made of stainless steel with argon gas, 2.6 mmoles of triethylaluminum, 0.39 mmole of phenyltrimethoxysilane and 7.1 mg of the solid catalyst synthesized in (C) were charged and hydrogen was introduced until its partial pressure reached 0.33 kg/cm². Then, 780 g of liquefied propylene was charged, temperature of autoclave was elevated to 80° C., and polymerization was continued for 2 hours at 80° C. After the polymerization, the unreacted monomer was purged. The resulting polymer was dried under reduced pressure at 60° C. for 2 hours to obtain 116 g of powdery polypropylene.

This means that the yield (grams) of polypropylene per one gram of solid catalyst component (hereinafter, abbreviated to PP/cat) was 16,300. Proportion (% by weight) of cold xylene-soluble component in the total polymer (hereinafter referred to as "CXS") was 1.3. Bulk density (g/ml) of the powdery polypropylene (hereinafter referred to as BD) was 0.42.

EXAMPLE 2

(A) Synthesis of ester-treated solid product

After replacing inner atmosphere of a 100 ml flask with argon gas, 6.5 g of the solid product synthesized in Example 1 (B), 16.2 ml of toluene and 4.3 ml (16 mmoles) of diisobutyl phthalate were charged and reacted at 95° C. for one hour.

After the reaction, the solid was separated from liquid and thrice washed with each 33 ml portions of toluene.

(B) Synthesis of solid catalyst

After completing the washing step of (A), 16.2 ml of toluene, 0.36 ml (1.3 mmoles) of diisobutyl phthalate, 2.2 ml (13 mmoles) of butyl ether and 38.0 ml (346 mmoles) of titanium tetrachloride were charged into the flask and reacted at 95° C. for 3 hours. After the reaction, the solid was separated from liquid at 95° C. and twice washed at that temperature with each 33 ml portions of toluene, after which the above-mentioned treatment using a mixture of diisobutyl phthalate, butyl ether and titanium tetrachloride was repeated once more under the same conditions as above and the solid was thrice washed with each 33 ml portions of hexane to obtain 5.0 g of an ocher colored solid catalyst.

The solid catalyst contained 2.1% by weight of titanium atom, 19.9% by weight of magnesium atom and 12.7% by weight of phthalic ester.

(C) Polymerization of propylene

Propylene was polymerized in the same manner as in Example 1 (E). PP/cat=22,100; CXS=1.5; BD=0.44.

COMPARATIVE EXAMPLE 1

(A) Synthesis of solid catalyst

A solid catalyst was synthesized in the same manner as in Example 2, except that, at the time of synthesizing solid catalyst, activating treatment was carried out with a mixture of butyl ether and titanium tetrachloride without using diisobutyl phthalate.

The solid catalyst thus obtained contained 2.2% by weight of titanium atom, 20.4% by weight of magnesium atom and 7.4% by weight of phthalic ester.

(B) Polymerization of propylene

Propylene was polymerized in the same manner as in Example 1 (E)

PP/cat=18,200; CXS=2.4; BD=0.42.

Since activating treatment was carried out with a mixture of butyl ether and titanium tetrachloride without using diisobutyl phthalate in this comparative example, the polymer obtained in this comparative example was inferior in stereospecificity to the polymers obtained in Examples 1 and 2.

COMPARATIVE EXAMPLE 2

(A) Synthesis of solid catalyst

A solid catalyst was synthesized in the same manner as in Example 2, except that the ester-treatment preceding the synthesis of solid catalyst was omitted and the amount of titanium tetrachloride used in the activating treatment was decreased to 13.5 mmoles per one gram of solid product. The solid catalyst thus obtained contained 6.5% by weight of titanium atom, 19.8% by weight of magnesium atom and 10.0% by weight of phthalic ester.

(B) Polymerization of propylene

Propylene was polymerized in the same manner as in Example 1 (E). PP/cat=14,000; CXS=10; BD=0.16.

Since the ester-treatment preceding the activating treatment was omitted in this comparative example, the polymer obtained herein was much inferior to the polymers obtained in Examples 1 and 2 in stereospecificity and bulk density.

EXAMPLE 3 to 5

A solid catalyst was synthesized in the same manner as in Example 2, except that the amounts of chemicals used in the ester-treatment and activating treatment were varied as shown in Table 1. Then, propylene was polymerized in the same manner as in Example 1 (E). Conditions of the synthesis and the results are summarized in Table 1.

TABLE 1

| | Catalyst synthesis | | | | | | | Results of polymerization | | |
|---|---|---|---|---|---|---|---|---|---|---|
| | Ester treatment | Activating treatment | | | Analyses | | | | | |
| | Amount of DBP (mmole/g) | Amount of DBP (mmole/g) | Amount of Bu$_2$O (mmole/g) | Amount of TiCl$_4$ (mmole/g) | Ti (% by wt.) | Mg (% by wt.) | Phthalic ester (% by wt.) | PP/cat (g/g) | CXS (% by wt.) | BD (g/ml) |
| Example 1 | 2.5 | 0.2 | 0 | 13.5 | 2.1 | 20.2 | 17.3 | 16,300 | 1.3 | 0.42 |
| Example 2 | " | " | 2.0 | 53.2 | 2.1 | 19.9 | 12.7 | 22,100 | 1.5 | 0.44 |
| Comparative Example 1 | " | 0 | " | " | 2.2 | 20.4 | 7.4 | 18,200 | 2.4 | 0.42 |
| Comparative Example 2 | 0 | 0.2 | " | 13.5 | 6.5 | 19.8 | 10.0 | 14,000 | 10 | 0.16 |
| Example 3 | 2.5 | 0.4 | " | 53.2 | 2.1 | 20.1 | 17.9 | 24,300 | 1.1 | 0.43 |
| Example 4 | " | 0.1 | " | 13.5 | 1.7 | 20.2 | 12.3 | 18,900 | 1.1 | 0.42 |
| Example 5 | 1.0 | 0.2 | " | " | 2.2 | 20.1 | 15.6 | 30,700 | 1.1 | 0.42 |

The amounts of reagents are expressed by millimoles reagent/one gram solid product.

EXAMPLE 6

(A) Synthesis of solid product

After replacing inner atmosphere of a 300 ml flask equipped with a stirrer and a dropping funnel with argon gas, 18.6 g of a styrene-divinylbenzene copolymer which had been dried under reduced pressure at 100° C. for 3 hours (mean particle diameter was 40 microns; pore volume in pore radius range of 200 to 2,000 angstroms was 0.99 ml/g as measured by means of porosimeter), 93 ml of heptane, 1.29 g (3.8 mmoles) of tetrabutoxytitanium and 13.3 g (63.8 mmoles) of tetraethoxysilane were charged into the flask and stirred at 30° C. for 30 minutes. Then, 33.8 ml of the organomagnesium compound synthesized in Example 1 (A) was dropped thereinto from the dropping funnel over a period of 45 minutes, while keeping the inner temperature of the flask at 5° C. After dropping it, the mixture was stirred at 30° C. for 45 minutes, twice washed with each 95 ml portions of heptane, and dried under reduced pressure to obtain 29.5 g of a brown colored solid product.

The solid product thus obtained contained 0.5% by weight of titanium atom.

(B) Synthesis of ester-treated solid

After replacing inner atmosphere of a 100 ml flask with argon gas, 4.3 g of the solid product synthesized in the reduction step of (A), 14.3 ml of toluene and 0.77 ml (2.3 mmoles) of diisobutyl phthalate were charged and reacted at 95° C. for 30 minutes. After the reaction, solid material was separated from liquid, and it was twice washed with each 14.3 ml portions of toluene.

(C) Synthesis of solid catalyst (activating treatment)

After completing the washing step of (B), 14.3 ml of toluene, 0.066 ml (0.24 mmole) of diisobutyl phthalate, 0.57 ml (3.4 mmoles) of butyl ether and 8.6 ml (78 mmoles) of titanium tetrachloride were charged and reacted at 95° C. for 3 hours. After the reaction, solid material was separated at 95° C. from liquid and twice washed with each 14.5 ml portions of toluene at the same temperature. The above-mentioned treatment using a mixture of diisobutyl phthalate, butyl ether and titanium tetrachloride was repeated once more over a period of one hour, and the solid was twice washed with each 14.5 ml portions of heptane and then dried under reduced pressure to obtain 3.9 g of a brown colored solid product.

The solid catalyst thus obtained contained 0.5% b weight of titanium atom, 4.5% by weight of magnesium atom and 3.8% by weight of phthalic ester.

(C) Polymerization of propylene

Propylene was polymerized in the same manner as in Example 1 (E). PP/cat=3,240; CXS=1.4; BD=0.45.

EXAMPLE 7

(A) Synthesis of pre-polymerization catalyst

After replacing inner atmosphere of a 300 ml flaks equipped with a stirrer with argon gas, 7.6 ml of a product prepared by contacting 8.7 mmoles of 2,2,6,6-tetramethylpiperidine with 100 ml of a 0.29 mole/liter solution of triethylaluminum in heptane at 60° C. for 3 hours, 250 ml of heptane and 1.25 g of the solid catalyst synthesized in Example 5 were charged into the flask and kept at 30° C. Then, propylene was introduced into the flask at atmospheric pressure and polymerized for 20 minutes. A part of the resulting slurry was sampled out and the quantity of polymerization was determined. PP/cat was 4.7.

(B) Polymerization of propylene

After replacing inner atmosphere of an 8 liter agitation type autoclave made of stainless steel with argon gas, 9.0 ml of the solution prepared in (A) by contacting 2,2,6,6-tetramethylpiperidine with triethylaluminum and 1 ml of the pre-polymerization catalyst slurry synthesized in (A) were charged, and then hydrogen was fed until its partial pressure reached 0.33 kg/cm². Then, 780 g of liquefied propylene was charged and temperature of the autoclave was elevated to 80° C., after which polymerization was continued at 80° C. for 2 hours. After the polymerization, the unreacted monomer was purged, and the formed polymer was dried under reduced pressure at 60° C. for 2 hours to obtain 255 g of powdery polypropylene.

The polymer thus obtained contained 4.0 ppm by weight of magnesium atom. CXS=3.6; BD=0.40.

EXAMPLE 8

(A) Synthesis of pre-polymerization catalyst

After replacing inner atmosphere of a 300 ml flask equipped with a stirrer with argon gas, 2.2 ml of a product prepared by contacting 15 mmoles of phenyltrimethoxysilane with 100 ml of a 1.0 mole/liter solution of triethylaluminum in heptane at 60° C. for 6 hours, 250 ml of heptane and 1.25 g of the solid catalyst synthesized in Example 5 were charged and kept at 30° C. Then, propylene was introduced thereinto under atmospheric pressure and polymerized for 30 minutes. A part of the resulting slurry was sampled out and the quantity of polymerization was determined. As the result, PP/cat was 5.5.

(B) Polymerization of propylene

After replacing inner atmosphere of a 3 liter agitation type autoclave made of stainless steel with argon gas, 2.6 ml of the solution prepared in (A) by contacting trimethylaluminum with phenyltrimethoxysilane and 2 ml of the pre-polymerization catalyst slurry synthesized in (A) were charged, after which hydrogen was fed until its partial pressure reached 0.33 kg/cm². Then, 780 g of liquefied propylene was charged, temperature of the autoclave was elevated to 80° C., and polymerization was continued at 80° C. for 2 hours. After completion of the polymerization, the unreacted monomer was purged, and the formed polymer was dried under reduced pressure at 60° C. for 2 hours to obtain 377 g of powdery polypropylene.

The polymer thus obtained contained 5.5 ppm by weight of magnesium atom. CXS=1.6; BD=0.40.

EXAMPLE 9

Copolymerization of ethylene and butene-1

After sufficiently replacing inner atmosphere of a 0.4 liter autoclave equipped with electromagnetic stirrer with argon gas, 90 g of butane, 1.0 mmole of triethylaluminum and 10 g of butene-1 were charged. After elevating the temperature to 60° C., hydrogen was fed until the total pressure reached 9 kg/cm² and thereafter ethylene was fed until the total pressure reached 15 kg/cm². Then, 2.1 mg of the solid catalyst synthesized in Example 5 was added to start a polymerization reaction. Thereafter, copolymerization of ethylene and butene-1 was continued for one hour at 60° C., while maintaining the total pressure constant by feeding ethylene continuously. After completion of the polymerization, the formed polymer was collected by filtration and dried under reduced pressure at 60° C. Yield of the polymer was 29 g. In this experiment, catalyst activity was 630,000 g polymer/g titanium, the copolymer had 16 ethyl groups per 1,000 carbon atoms.

We claim:

1. A process for producing a trivalent titanium compound-containing solid catalyst for use in the polymerization of olefins which comprises treating, with a mono- or poly-valent carboxylic ester selected from the group consisting of aliphatic carboxylic esters, olefinic carboxylic esters, alicyclic carboxylic esters and aromatic carboxylic esters, a solid product obtained by reducing a titanium compound represented by the following general formula, $$Ti(OR^1)_nX_{4-n}$$

wherein $R^1$ represents hydrocarbon group having 1 to 20 carbon atoms, X represents halogen atom, and n represents a number satisfying $0<n\leq 4$ with an organomagnesium compound in the presence of an organic silicon compound having Si—O bond which has any of the general formulae, $Si(OR^3)_mR^4_{4-m}$,
$R^5(R^6_2SiO)_pSiR^7_3$, and
$R^8_2SiO)_q$ wherein $R^3$ represents hydrocarbon group having 1 to 20 carbon atoms; $R^4$, $R^5$, $R^6$, $R^7$ and $R^8$ each represents hydrocarbon group having 1 to 20 carbon atoms or hydrogen atom; m represents a number satisfying $0<m\leq 4$; p represents an integer of 1 to 1,000; and q represents an integer of 2 to 1,000 to obtain an ester-treated solid product, and treating the ester-treated solid product with a mixture of the same mono- or poly-valent carboxylic ester as used in the step of producing the ester-treated solid product and titanium tetrachloride.

2. A process according to claim 1, wherein the step of treating the ester-treated solid product includes the step of selecting as the mixture a mixture of
a mono- or poly-valent carboxylic ester selected from the group consisting of aliphatic carboxylic esters, olefinic carboxylic esters, alicyclic carboxylic esters and aromatic carboxylic esters, a dialkyl ether, and titanium tetrachloride.

3. A process according to claim 1, wherein $R^1$ in the titanium compound represented by the general formula $Ti(OR^1)_nX_{4-n}$ is alkyl groups having 2 to 18 carbon atoms and aryl groups having 6 to 18 carbon atoms.

4. A process according to claim 3, wherein $R^1$ in the titanium compound represented by the general formula $Ti(OR^1)_nX_{4-n}$ is straight chain alkyl groups having 2 to 18 carbon atoms.

5. A process according to claim 1, wherein the value of n in the titanium compound represented by general formula $Ti(OR^1)_nX_{4-n}$ is $2\leq n\leq 4$.

6. A process according to claim 5, wherein the value of n is 4.

7. A process according to claim 1, wherein the organomagnesium compound is Grignard compounds represented by general formula $R^9MgX$ ($R^9$ represents hydrocarbon group having 1 to 20 carbon atoms and X represents halogen atom), dialkylmagnesium compounds or diarylmagnesium compounds represented by general formula $R^{10}R^{11}Mg$ ($R^{10}$ and $R^{11}$ each represents hydrocarbon group having 1 to 20 carbon atoms), among which $R^9$, $R^{10}$ and $R^{11}$ are identical or different from one another.

8. A process according to claim 1, wherein the organic silicone compound is alkoxysilane compounds represented by general formula $Si(OR^3)_mR^4_{4-m}$ wherein m satisfies $1\leq m\leq 4$.

9. A process according to claim 8, wherein the alkoxysilane compound is tetraalkoxysilane compounds satisfying $m=4$.

10. A process according to claim 1, wherein the ether compound is diethyl ether, dipropyl ether, diisopropyl ether, dibutyl ether, diamyl ether, diisoamyl ether, dineopentyl ether, dihexyl ether, dioctyl ether, methyl butyl ether, methyl isoamyl ether, or ethyl isobutyl ether.

11. A process according to claim 10, wherein the ether compound is dibutyl ether or diisoamyl ether.

12. A process according to claim 1, wherein the organomagnesium compound is added to a mixture of titanium compound and an organic silicone compound.

13. A process according to claim 12, wherein the titanium compound and organic silicone compound are used after disolving or diluting them with an appropriate solvent.

14. A process according to claim 13, wherein the solvent is aliphatic hydrocarbons, aromatic hydrocarbons, alicyclic hydrocarbons, or ether compounds.

15. A process according to claim 1, wherein the reduction is carried out at a temperature ranging from $-50°$ to $70°$ C.

16. A process according to claim 1, wherein the reduction is carried out in the presence of a porous material having a pore volume of 0.3 ml/g or more as measured at a pore radius of 200 to 2,000 angstroms and having a mean particle diameter of 5 to 300 microns.

17. A process according to claim 16, wherein the porous material is inorganic oxide or organic polymer.

18. A process according to claim 17, wherein the porous inorganic oxide is $SiO_2$, $Al_2O_3$, MgO, $TiO_2$, $ZrO_2$, $SiO_2\cdot Al_2O_3$, $MgO\cdot Al_2O_3$ or $MgO\cdot SiO_2\cdot Al_2O_3$.

19. A process according to claim 17, wherein the porous organic polymer is polystyrene type, polyacrylic ester type, polymethacrylic ester type, polyacrylonitrile type, polyvinyl chloride type or polyolefin type polymers.

20. A process according to claim 1, wherein the amount of organic silicon compound is in the range of 1 to 50 as expressed in terms of atomic ratio of silicon atom to titanium atom (Si/Ti) in titanium compound.

21. A process according to claim 1, wherein the amount of the organomagnesium compound is in the range of 0.1 to 10 as expressed in terms of atomic ratio of the sum of titanium atom and silicon atom to magnesium atom (Ti+Si/Mg).

22. A process according to claim 1, wherein the amount of ester compound for treating the solid product is 0.1 to 50 moles per one mole of titanium atom in the solid product.

23. A process according to claim 1, wherein the amount of ester compound for treating the solid product is used in an amount of 0.01 to 1.0 mole per one mole of magnesium atom in the solid product.

24. A process according to claim 1, wherein the solid product is treated with the ester compound in the presence of a diluent.

25. A process according to claim 24, wherein the diluent is aliphatic hydrocarbons, aromatic hydrocarbons, alicyclic hydrocarbons or halogenated hydrocarbons.

26. A process according to claim 24, wherein the amount of diluent is 0.1–1000 ml per one gram of the solid product.

27. A process according to claim 1, wherein the solid product is treated with the ester compound at $-50°$ to $150°$ C. for 10 minutes or more.

28. A process according to claim 27, wherein the solid product is treated with the ester compound at $0°-120°$ C. for 30 minutes to 3 hours.

29. A process according to claim 1, wherein the ester-treated solid product is treated with a mixture of an ester compound and titanium tetrachloride in a slurry state.

30. A process according to claim 29, wherein a solvent used for slurry is aliphatic hydrocarbons, aromatic hydrocarbons, alicyclic hydrocarbons or halogenated hydrocarbons.

31. A process according to claim 29, wherein a concentration of slurry is 0.05–0.7 g.solid per ml of solvent.

32. A process according to claim 29, wherein the treatment is carried out at a temperature of 30°–150° C. for 30 minutes to 6 hours.

33. A process according to claim 1, the amount of the ester compound in the mixture for treating the ester-treated solid product is 0.02 to 30 moles per one mole of titanium atom in the ester-treated solid product.

34. A process according to claim 1, wherein the amount of titanium tetrachloride in the mixture for treating the ester-treated solid product is 1 to 1,000 moles per one mole of titanium atom in the ester-treated solid product.

35. A trivalent titanium compound-containing solid catalyst for use in the polymerization of olefins which is produced by treating, with a mono- or poly-valent carboxylic ester selected from the group consisting of aliphatic carboxylic esters, olefinic carboxylic esters, alicyclic carboxylic esters and aromatic carboxylic esters, a solid product obtained by reducing a titanium compound represented by the following general formula, $$Ti(OR^1)_n X_{4-n}$$

wherein $R^1$ represents hydrocarbon group having 1 to 20 carbon atoms, X represents halogen atom, and n represents a number satisfying $0 < n \leq 4$, with an organomagnesium compound in the presence of an organic silicon compound having Si—O bond which has any of the general formulae, $Si(OR^3)_m R^4_{4-m}$, $R^5(R^6{}_2SiO)_p SiR^7{}_3$, and $R^8{}_2SiO)_q$ wherein $R^3$ represents hydrocarbon group having 1 to 20 carbon atoms; $R^4$, $R^5$, $R^6$, $R^7$ and $R^8$ each represents hydrocarbon group having 1 to 20 carbon atoms or hydrogen atom; m represents a number satisfying $0 < m \leq 4$; p represents an integer of 1 to 1,000; and q represents an integer of 2 to 1,000 to obtain an ester-treated solid product, and treating the ester-treated solid product with a mixture of the same mono- or poly-valent carboxylic ester as used in the step of producing the ester-treated solid product and titanium tetrachloride.

36. A trivalent titanium compound-containing solid catalyst according to claim 35, wherein the step of treating the ester-treated solid product includes the step of selecting as the mixture
a mixture of
a mono- or poly-valent carboxylic ester selected from the group consisting of aliphatic carboxylic esters, olefinic carboxylic esters, alicyclic carboxylic esters and aromatic carboxylic esters, a dialkyl ether, and titanium tetrachloride.

* * * * *